United States Patent Office 3,580,879
Patented May 25, 1971

3,580,879
GELABLE COMPOSITIONS AND PROCESS OF USING THE SAME
Einosuke Higashimura, Tokyo, Katsumi Tamai, Ohtakeshi, and Eiichi Nakamura, Tokyo, Japan, assignors to Mitsubishi Rayon Co., Ltd., Tokyo, Japan
No Drawing. Filed Aug. 29, 1967, Ser. No. 663,992
Claims priority, application Japan, Sept. 8, 1966, 41/59,358
Int. Cl. C08f 15/02; F21b 33/13
U.S. Cl. 260—29.7H           6 Claims

ABSTRACT OF THE DISCLOSURE

A gelable, non-toxic and odorless composition for construction materials which comprises (1) 1-90% by weight of metal methacrylates or acrylates, such as magnesium methacryate,
(2) 3-90% by weight of water-soluble ethenoid monomers, such as acrylamide and a compound of

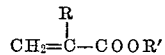

(R is —H or —CH$_3$, and R' is an alkyl having —OH or —NH$_2$), and
(3) 1-30% by weight of water-soluble divinyl monomers such as glyceroldiacrylate.

A process for stabilizing such construction materials as cement and soil, wherein an aqueous solution of the composition and a redox catalyst is added thereto, and high strength and superior impermeability to water can be provided. The period for gelation may be controlled as desired.

In a rapid stabilization process for construction materials adding a gelable composition comprising (1) water-soluble vinyl monomers and (2) water-soluble divinyl monomers and a redox catalyst thereto, the method wherein β-diketone is used as a component of the redox with or without metallic ions. Sodium formaldehyde sulfoxylate, a reducing sugar, a water-soluble amine can also be used as said component.

---

The present invention relates to novel and improved gelable compositions, the resulting gelled compositions, and methods of uses. In particular, the present invention relates to grouting compositions suitable for injection into interstices or fissures in earth formations including soil and rock masses in order to impermeabilize them against the transmission of fluids therethrough and more particularly to improved stabilization systems of these types having more lasting impermeability to the transmission of water and other substantially inert fluids. More particularly, the present invention relates to a quick setting cement having particular utility in the construction field.

In a more detailed scope the present invention relates to a water soluble system of monomeric materials comprising a salt of methacrylic acid and/or acrylic acid, the water-soluble ethenoid monomers, said system being capable of being applied in an aqueous solution or hydraulic cements to soil or to under-ground areas containing fissures, and polymerized and cross-linked with the aid of a catalyst to a state of water insolubility and impermeability. The principal function of the novel system of the invention is the creation of a more lasting impermeability in the treated strata.

The erosion and permeability characteristics of soil have presented many continuing problems to engineers. The erosion of and percolation of water through dams, levees constructed of earth, water supply and drainage, subways, and reservoirs have occasionally resulted in disasters and usually require vigilant maintenance with recurring expenditures for reconstruction and repair. Serious problems are also encountered in passages or channels in the earth due to the leakage of water from subterranean springs into tunnels especially undersea tunnels or from the normal water table into oil wells through porous strata of the earth. In addition, during drilling, large quantities of valuable oil well drilling muds are lost when the mud under pressures passes from the well out into porous formations, such as shale and sandstone. This is commonly referred to as lost circulation. Another problem of great magnitude is the seepage of soil water into basements and cellars. This is very difficult to prevent, especially in existing structures except at great expense by removal of all earth from the exterior of the cellar walls in order to permit the application of waterproofing compositions directly to the exterior masonry walls. In excavating, and especially in trenching, a loose sandy soil or mud, the excavation must be made much wider than otherwise necessary by reason of adjacent soil falling or sliding back into the trench or excavation. Since this entails the removal of large quantities of additional earth at a greater expense, it would be highly desirable to be able to stabilize the adjacent soil in order that the excavations could be made with substantially vertical walls. Accordingly, there is a real need for soil treatments providing improved strength or lowered permeability to water or both which preferably do not require the removal of the soil from the ground in all applications.

An object of this invention is to provide cohesive soil masses. An additional object of the invention is provided stabilized soil compositions of decreased permeability to inert liquids, particularly water and sea-water.

A further object of the invention is to provide soil masses of enhanced load-bearing qualities.

It is another object of the invention to increase markedly the viscosity of fluid muds. Still another object of the invention is to solidify soil.

A still further object of the invention is to impart flexibility to soil masses. Another object of the invention is to seal porous formations in the earth against the passage of liquids.

Yet another object of the invention is to prevent lost circulation of drilling muds in oil wells. A still further object of the invention is to cement casings or liners in place in channels in the earth.

Another object of the invention is to stabilize the soil surrounding subterranean foundations or anchors.

A still further object of the invention is to provide soil compositions suitable for use as pseudo-monolithic or integral structures or for molding into individual structural building units. Still another object of the invention is to stabilize soil against caving in or sliding. Other objects and advantages of the invention will be apparent to those skilled in the art upon consideration of the detailed disclosure hereinbelow.

The present invention comprises certain compositions which are capable of conversion by or interpolymerization or copolymerization of the polymerizable substances to a state wherein the essential final components are not substantially self-dispersible in water to any significant extent, various processes by which these compositions are prepared or formed, and the resulting water-insoluble products. The convertible, compositions comprise at least three components which are polyvalent metal salt of methacrylic acid and water-soluble ethenoid monomers and water-soluble divinyl monomers. These compositions rapidly polymerize to give an initial strength which at least sufficient to hold the concrete in position, so that in effect there is produced an aggregate filled polymer, and then the concrete itself hardens to produce a concrete the strength of which is increased by the presence of the polymer, and impart sufficient cohesion to soil so that it will support heavy loads.

The present invention comprises at least three components which are polyvalent metal salt of acrylic acid and water-soluble ethenoid monomers and water-soluble divinyl monomers. Those compositions set cement quickly and impart particular utility in the construction field.

The present invention relates to concrete which has a very rapid setting time and which has improved strength after completely hardening and a method of making this concrete which comprises introducing a small but effective amount of a water soluble polymerizable mixture of a monovalent metallic salt of acrylic acid and for methacrylic acid and ethenoid comonomers and divinyl monomers with a suitable catalyst into the concrete as it is mixed.

The present invention relates to methods for the stabilization of soils with polymeric materials consisting of metallic salts of acrylic acid and/or methacrylic acid and water-soluble divinyl monomers and the specific water-soluble ethenoid monomers having the formula:

$$CH_2=\overset{R}{\underset{|}{C}}-COOR'$$

in which R is hydrogen or methyl group and R' is a member of the group consisting of alkyl radical containing at least one hydroxyl or amino radical.

The present invention relates to methods for the stabilization of soils and quick setting cement with polymeric materials consisting of water-soluble vinyl monomers and water-soluble divinyl monomers with the specific redox catalysts.

According to the present invention, gelation time may be controlled to a wide range, which is from a few seconds to a few hours, and there can be provided high strength and superior impermeability to water. Being not toxic and odorless, they can widely be applied to stabilization of constructions. As suitable water-soluble ethenoid monomer used in the present invention, for example, there may be mentioned 2-hydroxyethyl methacrylate, dimethylaminoethyl methacrylate, propyleneglycol monoacrylate, acrylamide, methacrylamide, N-methylolacrylamide, N-methylolmethacrylamide, acrylonitrile, vinyl acetate and the like. In particular, when compounds represented by the following general formula is used:

$$CH_2=\overset{R}{\underset{|}{C}}-COOR'$$

in which R is hydrogen or methyl radical; and R' is a member of the group consisting of alkyl radical containing at least one hydroxyl or amino radical.

Gelable material having very high strength and lower permeability to water can be obtained. These monomers are not always limited to one kind and a mixture of two or more kinds can be used. For example, when a mixture of acrylamide and acrylonitrile, or a mixture of acrylamide, N-methylolacrylamide and acrylonitrile are used, gelable composition having excellent performance can be obtained. As water-soluble divinyl monomers in the present invention, for example, alkylidenebisacrylamide represented by methylenebisacrylamide, alkylidenebismethacrylamide represented by methylenebismethacrylamide 1,3-di(acrylamidomethyl)-2-imidazolidone, 1,3 - di(methacrylamidomethyl)-2-imidazolidone, or glycerolacrylate, glycerolmethacrylate and 1,3,5-triacrylylperhydro-1,3,5-triazine may be mentioned.

These monomers are not always limited to one kind and a mixture of two or more kinds can be used.

Further, as the metal salts of acrylic acid and metal salts of methacrylic acid used in the present invention, for example, water-soluble polyvalent salt such as calcium, magnesium, zinc, strontium and aluminum salts of acrylic acid and monovalent salt such as sodium, potassium of acrylic acid, moreover water-soluble polyvalent salt such as calcium magnesium, zinc, barium, strontium and aluminium salts of methacrylic acid and monovalent salt such as sodium and potassium salts of methacrylic acid can be mentioned. As the metal salts of acrylic acid or methacrylic acid used in the present invention, when polyvalent salts of methacrylic acid are used, they can be applied to very wide extent such as direct injection into soil, use of cement milk together, setting of material for construction such as cement paste, cement mortar and concrete.

Solution of gelable composition containing, in particular, magnesium salt of methacrylic acid does not separate crystalline even below —3° C. when used in relatively highly concentrated solution and can impart excellent strength to each of the above mentioned end-uses.

In the present invention, when the above mentioned water-soluble ethenoid monomer is used with polyvalent metal salts of acrylic acid, monovalent metal salts of acrylic salt and/or monovalent metal salts of methacrylic acid, excellent performance can be obtained particularly in setting of cement material.

In practicing the invention, a copolymerizable composition containing polyvalent metallic salts of acrylic acid or monovalent metallic salts of acrylic acids and/or monovalent metallic salts of methacrylic acid; water-soluble ethenoid monomers having the formula:

$$CH_2=\overset{R}{\underset{|}{C}}-COOR'$$

wherein R is a hydrogen or methyl group and R' is an alkyl radical having at least one substituent replaced by a hydroxyl or amino group is used as the said water-soluble ethenoid monomer with polyvalent salts of acrylic acid, monovalent metal salts of acrylic acid or monovalent metal salts of methacrylic acid, excellent performance can be obtained in soil stabilizing as well as in cement material setting. The quantitative proportion of water-soluble ethenoid monomer in a mixed aqueous solution of metal salt of acrylic acid or methacrylic acid, water-soluble ethenoid monomer and water-soluble divinyl monomer is generally in the range of from 1 to 30%. The quantitative proportion of the water-soluble divinyl monomer is 1–96%.

Furthermore, in a process for polymerizing a water-soluble divinyl compound or polymerizable mixture consisting of at least one of water-soluble divinyl compounds and at least one of water-soluble vinyl compounds copolymerizable therewith according to redox polymerization in soil or cement substance to convert to a substantially water-insoluble state, the present invention relates to a process for rapidly carrying out gelation by using a specific reducing agent as a reduction component of redox catalyst. To polymerize chemical grout in soil or cement, ordinary radical polymerization can be used as a means therefor, wherein ammonium persulfate, potassium persulfate, hydrogen peroxide or the like is used. When each of these substances is used singly, however, initiation takes a long period of time. In order to carry out the polymerization rapidly at a low temperature, it is effective to use the so-called redox catalyst prepared by combining these peroxides with reductive substances. As the reductive substances, there has been used a tertiary amine, reductive metal ion or 1-ascorbic acid together with reductive metal ion, or sodium thiosulfate. They are, however, not always satisfactory therefor.

That is, as a manner of usage of chemical grout, there are two cases; one in a manner where the chemical grout is directly poured into micro spaces between soils; and the other where the chemical grout is used together with cement milk for mainly preventing leakage of water from subterranean springs. Accordingly, a redox catalyst to be used in these cases must be the one which is capable of effectively acting as a catalyst therefor. Particularly, in case of preventing vigorous leakage of water from subterranean springs using chemical grout together with cement milk or in the case where rate of curing of chemical grout is necessary as rapid as possible due to high speed of subterranean water stream, it is necessary to cure the chemical grout in a several seconds to several minutes. Consequently, in case of employing amines, a large amount thereof is required for shortening gelation time, whereby working efficiency may be lowered due to bad odor thereof and the human body is exposed to many hazards by contact therewith through the skin or grabs.

In the case where reductive metal ion such as Fe (II) is singly used as a reductive component of redox catalyst, the curing does not proceed at all before the reductive metal ion amounts to an effective given amount. When the reductive metal ion reaches a definite amount, only a portion of the whole rapidly cures but the curing of the remaining portions is extremely retarded whereby a definite curing time required for the whole portion becomes hardly possible to determine. Such phenomenon wherein the curing inhomogeneously takes place is a phenomenon which is extremely disadvantageous, because the whole portion may be pushed out before being cured by large water pressure. Accordingly, in this case there has already been lost the possibility of arbitrarily adjusting the curing time.

In the case where 1-ascorbic acid and reductive metal ion are used together as reductive components of redox catalyst, there is no injurious action or bad odor as in the case of amines. The catalyst system, however, is capable of effectively acting as a catalyst only in an acidic environment, and therefore catalytic activity is lost when cement milk is used together.

Activity of sodium thiosulfate is inferior to those of the above-mentioned reductive components. In order to achieve an appropriate gelation time, it is necessary to use a large amount of sodium thiosulfate, which is not suited for preventing permeation of water in an extremely short period of time when used together with cement milk.

Under such circumstances, none of the above-mentioned catalyst systems being presently used as polymerization catalysts for chemical grout is found to be satisfactory. Especially, researches of novel reductive components have been demanded therefor. The present inventors have fully studied these redox catalyst systems in line with the objects of the present invention and attempted to improve catalytic activity thereof. As the result, it has been found that very satisfactory result can be obtained by using, as a reductive component, a water-soluble amine together with a selected metal ion; β-diketone; β-diketone together with a selected reductive metal ion; reductive saccharides together with a selected reductive metal ion or sodium formaldehyde sulfoxylate. This finding has resulted in completion of the present invention.

When a water-soluble amine and reductive metal ion are used as the reductive components of redox catalyst of the present invention, gelation time can be shortened to an extreme extent, and therefore, a very small amount of amine can satisfactorily be used, whereby the influence thereof on the human body can be lessened. As the water-soluble amines used in the present invention, there may be mentioned dimethylaminopropionitrile, triethanolamine, N,N,N',N' - tetramethylethylenediamine, dimethylaminoethanol, dimethylamino propanol, triethylamine, N-methylmorpholine, trimethylamine, triethylenetriamine, triethylene-tetramine, diethanolamine, hexamethylene-diamine, ethylenediamine, hexamethylenetetramine, t-butyl-amine and the like.

The amounts of these amines used may be changed depending on the gelation time required, but generally they are in the range of from 0.01–2.0% by weight based on the polymerization components. Furthermore, the amount of reductive metal ion to be used is 0.001–5% by weight based on the polymerization components.

As the reductive metal ions, there may be used ions of Sn, Fe, Ag, Mn, Co, Ni, Cu, Zn, Pb, and Fe and Cu or ion selected from the group consisting of these ions.

Instantaneous setting property of the present catalyst system is very excellent, which is considered to be attributable to an intimate synergism between amine and reductive metal ion.

As is clear from the examples and comparative examples hereunder described, the setting time in accordance with the catalyst system of the present invention can significantly be shortened, compared with such systems as peroxide, water-soluble tertiary amine, peroxide, reductive metal ion, and peroxide-1-ascorbic acid, which have conventionally been considered to be effective. The above fact is ascribable to property of the catalyst system, for instance, in the system of peroxide and tertiary amine or reductive metal ion alone, the above-mentioned effect cannot be accomplished even when the amount of the tertiary amine or reductive metal ion is increased, respectively.

Furthermore, in the present system, setting time can be adjusted to a wide extent thereby the present invention is highly evaluated.

Moreover, the present catalyst system is excellent in homogeniety of setting. For example, in case of a catalyst system of peroxide and reductive metal ion such as Fe, setting unequally proceeds because the setting does not take place before the metal ion reaches a given amount. As a result, it takes a long period of time before the whole portion becomes to have a necessary strength. The catalyst system of the present invention, however, sufficiently strong strength over the whole portion can be obtained immediately after completion of setting. This fact is well understood to be useful for the objects of the present invention when a consideration is directed to the case where it is used for preventing vigorous leakage of water from subterranean springs. Further, the effectiveness of the present catalyst system is not lost in an alkali environment. In practicing the present invention, the above fact is very useful in consideration of the surrounding circumstances, of which the greater part is alkaline.

Furthermore, it is the fact to be remarked that the amine which is one of reductive components used in the present catalyst system may be a primary amine, secondary amine or polyamine whereas a tertiary amine is used in conventional redox catalyst systems.

Still further, when the present catalyst system in which a combination of ions of Fe and Cu is used as a reductive metal ion is applied to cement, besides the abovementioned effect, flowing property thereof is significantly improved thereby much improvement in working efficiency can be expected.

As the β-diketones used as reductive components in the redox catalyst of the present invention, there may be enumerated methyl acetoacetate, ethyl acetoacetate, sodium acetoacetate, acetoacetic acid, acetylacetone, benzoylacetone, dibenzoylmethane, trifluoroacetyl-acetone, 2-phloyltrifluoroacetone, benzoyltrifluoroacetone, methacryloylacetone, β-methylacryloylacetoacetate and the like. Amongst these β-diketones, methyl acetoacetate, ethyl acetoacetate and acetylacetone are particularly preferred.

Furthermore, it has been found that much larger catalytic activity can be exhibited by using these β-diketones together with a selected reductive metal ion than that can be obtained by using β-diketone alone. In this case, the reductive metal ion to be used must be a selected metal ion. For example, when cobalt ion is used together with acetylacetone, a large activity of the acetylacetone inversly results in a loss. Ag, Fe and Sn ions are used as particularly effective reductive metal ions. The amount of β-diketones used in the present catalyst system is not subject to any limitation. When a long setting time is required, a very small amount is sufficient. When a very short period of time for setting within 10 seconds is required, a large amount as much as 20% based on the weight of the polymerization components can be used, but such amount exceeding the above range is not advantageous in view of economy.

As mentioned hereinabove, it is possible to set up a cement milk in several seconds at normal temperature, for example, in 5 seconds at 20° C., by using β-diketones or combination of β-diketone with reductive metal ion as a reducing agent of redox catalyst and incorporating a water-soluble divinyl compound or mixture of water-soluble divinyl compound and water-soluble vinyl compound into cement milk, whereby formation of a strong, substantially water-insoluble and water-impermeable gel containing cement can quickly be completed, which makes it possible to instantaneously prevent vigorous leakage of water from substerranean springs in accordance with the present invention.

As for the reductive saccharides used together with reductive metal ion as reductive component of the redox catalyst of the present invention, any of saccharides can be used, but hexose is particularly preferred. Furthermore, maltose can also be used, which is, however, of disaccharise. As a hexose, there may be included aldohexose consisting of D and L-galactose, D and L-tarose, D and L-altorose, D and L-arose, D and L-glucose, D and L-mannose, D and L-idose and, D and L-grose; and ketohexose consisting of D and L-tagtose, D and L-pshicose, D and L-sorbose and, D and L-fuructose. When each of these reductive saccharides is used singly, catalytic activity is not sufficiently exhibited. In order to obtain a required gelation time, it is necessary to use a large amount which is considered to be inadequate from the economical point of view. As the reductive metal ion which is capable of improving catalytic activity by using these saccharides together, there may be mentioned Ag, Cu, Sn, Fe, Mn, Co or Ni ion. Particularly satisfactory result can be obtained by using Ag and Cu ions. As previously mentioned, when each of these metal ions is used singly, there is a large defect that instantaneous setting property is very unreliable. InI the case of Cu ion, catalytic activity can hardly be exhibited when used alone. Accordingly, the defect of these metal ions has thus been overcome by using the same together with the reductive saccharides. The present catalyst system does not have such toxicity and bad odor as in the case of the amines. Accordingly, the present catalyst system can be used without any anxiety even in a closed place such as tunnel or subterranean spot whereby no decline of working efficiency due to bad odor is caused.

In emloying the present catalyst system, it is preferable to use the reaction system being alkaline if circumstances allow. Consequently, a very large catalytic activity can be obtained when used together with cement milk for preventing vigorous leakage of water from subterranean springs. And the effect of prevention of leakage of water is very large because ambiguity of instantaneous setting property as can be seen in the case of singly using reductive metal ion can be greatly improved. Furthermore, strength of soil or cement to which the reductive saccharide and reductive metal ion are applied as reductive components of the redox catalyst of the present invention is equal to that obtained in accordance with conventional redox catalysts.

The amounts of reductive saccharides used in the present catalyst system can be changed depending on the gelation time required, but generally they are used in a proportion of 0.01–20% by weight based on the polymerization components. Furthermore, the amounts of reductive metal ion used together therewith is in a proportion of 0.001–5% by weight based on the polymerization components.

When sodium formaldehyde sulfoxylate is used as a reductive component of the redox catalyst of the present invention, rapid gelation can be carried out entirely regardless of a pH of the reaction system. That is, it is possible to carry out rapid gelation without losing catalytic activity even in a strong basic environment such as cement milk and, even in acid soil which can frequently be seen. Accordingly, in order to prevent generation of ammonia due to decomposition of acrylamide, it is possible to carry out polymerization in an acidic atmosphere.

Furthermore, the present catalyst is very effective in preventing vigorous leakage of water from subterranean springs by using cement milk together, because it can be used in a basic environment. Because catalytic activity of the present catalyst is strong, when rapid setting with use of cement milk is required, a small amount can sufficiently be used for accomplishing the object. Accordingly, no decline of working efficiency due to bad odor can be expected and this is very economic. Strength of soil or cement set by using rongalite as a reductive component of the present catalyst is equal to that obtained in the case of conventional redox catalyst. Furthermore, the sodium formaldehyde sulfoxylate can be used in an amount of 0.01–10% based on the weight of the polymerization components.

The divinyl compounds and vinyl compounds used in the present invention are necessary to be water-soluble at a concentration of the liquid composition being poured in practice. As the examples of water-soluble divinyl compounds, there may be mentioned polyvalent salt of acrylic acid such as calcium acrylate, magnesium acrylate, zinc acrylate, etc., polyvalent salt of methacrylic acid such as magnesium methacrylate, calcium methacrylate, strontium methacrylate, etc., compounds typically represented by methylenebis-acrylamide such as alkylidenebisacrylamide, glyceloldiacrylate, 1,3-di (methylacrylamide)-2-imidazolidone, 1,3-di [methacrylamide-methyl] - 2 - imidazolidone and a mixture of dimethylolurea and unsaturated amide as disclosed in Japanese patent publication No. 333/66. It is of course possible to use any of other water-soluble divinyl compounds than the above-mentioned. As the examples of water-soluble vinyl compounds, there are mentioned acrylic acid and its monovalent salts, methacrylic acid and its monovalent salts, acrylamide, methacrylamide, N-methylolacrylamide, N-methylolmethacrylamide, or alkyl ester of acrylic and methacrylic acids such as hydroxyethylacrylate, hydroxypropylacrylate, 2 - hydroxyethylmethacrylate, and dimethylaminoethyl-methacrylate.

The method of using the present invention is not limited to the direct pouring into soil and pouring into soil using cement milk together therewith. It is possible to rapidly setting general cement substances such as paste, mortar, concrete etc. to which the present invention is applied. A wide variety of utilities of the present invention in the field of cement industries is expected, and a merit of industrial utilization, particularly in the production of cement blocks according to centrifugal casting method and so forth is very large.

The following examples are merely illustrative, and it is not intended that the scope of the invention be limited to the details therein set forth. All parts are given in terms of weight, and the soil is in the air dry condition unless otherwise set forth.

EXAMPLE 1

Aqueous solution of magnesium methacrylate and 2-hydroxyethylene methacrylate was mixed with 1,3-di acrylamidomethyl-2-imidazolidone. A redox catalyst of ammonium persulfate-β-dimethylamino-propionitrile was added, and the catalyzed compositions are mixed with Toyoura standard sand, then the gelation was initiated after lapse of 2 minutes and thirty seconds. After lapse of 2 hours, the compressive strength of the sand gel was measured. The result observed is shown in Table 1.

EXAMPLES 2–15

The polymerizable components consisting of metal salts of methacrylic acid, water-soluble ethanoid monomers and water-soluble divinyl compounds as shown in Table 1 were used to congeal Toyoura standard sand or cement in accordance with the procedures of Example 1. The respective compressive strengths of the gels were measured, and the results are shown in Table 1.

REFERENCE EXAMPLES 1–5

When mixed aqueous solutions of metal salts of methacrylic acid and water-soluble divinyl monomers and a redox catalyst together were mixed with Toyoura standard sand, the gelation was initiated after lapse of about 3 minutes. When cement was mixed therewith, the gelation was initiated after lapse of about 2 minutes. The respective compression strengths of the sand gels and cement gels was measured after lapse of 2 hours, the results are shown in Table 1.

TABLE 1

| Number of example | Polymerization component | Weight percent Mixed ratio of polymerization component | Total resin monomer concentration cm.² | Compressive intensity of setting after two hours | |
|---|---|---|---|---|---|
| | | | | Sand gel, kg./cm.² | Cement gel, kg./cm.² |
| 1 | Mg(MA)₂ / HEMA / DAI | 80.3 / 6.7 / 13.0 | 18.4 | | |
| 2 | Mg(MA)₂ / MAAm / DAI | 69.7 / 9.4 / 20.9 | 17.3 | 5.3(2'10") | |
| 3 | Mg(MA)₂ / HEMA / GDA | 74.7 / 14.3 / 11.0 | 17.4 | 6.5(2') | |
| 4 | Mg(MA)₂ / HEMA / GDA | 87.8 / 6.9 / 5.3 | 17.9 | 4.3(2') | |
| 5 | Ca(MA)₂ / HEMA / DAI | 66.2 / 20.5 / 13.3 | 1.38 | 4.6(2'15") | 2(1'50") |
| 6 | Ca(MA)₂ / HEMA / DAI | 67.7 / 23.3 / 2.0 | 13.5 | 4.7(5') | 11(3'05") |
| 7 | Ca(MA)₂ / HEMA / MBAAm / DAI | 62.3 / 12.8 / 13.5 / 12.4 | 14.7 | 4.4(2'05") | 2.2(1'30") |
| 8 | Ca(MA)₂ / HEMA / MBAAm | 69.8 / 21.6 / 8.6 | 13.1 | 4.7(4'30") | 1.9(2'15") |
| 9 | Ca(MA) / HEMA / GDA | 69.0 / 23.7 / 7.3 | 13.3 | 4.5(4'50") | |
| 10 | Ca(MA)₂ / PGA / DAI | 66.1 / 20.5 / 13.4 | 13.8 | 5.0(2'02") | 2.0(1'12") |
| 11 | Ca(MA)₂ / AN / DAI | 75.3 / 9.6 / 15.1 | 12.2 | 3.6(4'43") | 1.2(3'41") |
| 12 | Ca(MA)₂ / AAm / DAI | 68.6 / 9.4 / 22.0 | 13.4 | 2.6(3'20") | |
| 13 | Sr(MA)₂ / HEMA / DAI | 70.8 / 11.9 / 11.3 | 16.0 | 5.8(4'30") | 1.4(3'20") |
| 14 | Ba(MA)₂ / HEMA / DAI | 74.3 / 15.7 / 10.0 | 18.0 | 4.8(4'20") | 1.9(3'40") |
| 15 | Mg(MA)₂ / MAAm / HEMA / DAI | 8 / 65 / 15 / 12 | 6.5 | 7.4(4'35") | |

TABLE 1'

| Number of example | Polymerization component | Weight percent Mixed ratio of polymerization component | Total resin monomer concentration | Compressive intensity of setting after two hours | |
|---|---|---|---|---|---|
| | | | | Sand gel, kg./cm.² | Cement gel, kg./cm.² |
| 1 | Ca(MA)₂ / DAI | 78.7 / 21.3 | 12.0 | 1.1(2'45") | 0.5(2') |
| 2 | Ca(MA)₂ / MBAAm | 85.9 / 14.1 | 11.0 | 0.6(2') | 0.3(1'30") |
| 3 | Mg(MA)₂ / DAI | 87.5 / 12.5 | | 2.8(3'30") | |
| 4 | Sr(MA)₂ / DAI | 87.8 / 12.2 | 18.8 | 1.3(4'10") | 0.7(3') |
| 5 | Ba(MA)₂ / DAI | 90.5 / 9.5 | 22.1 | 1.0(4') | 0.5(3'20") |

NOTES
1. All percentages are by weight.
2. Signs representing polymerization components to be read as follows: Ca(MA)₂=Calcium methacrylate; DAI=1.3-di(acrylamidomethyl)-2-imidazolidone; PGA=propyleneglycol monoacrylate; MBAAm=Methylenebisacrylamide; HEMA=2-hydroxyethyl methacrylate AN=Acrylonitrile; GDA=Glyceroldiacrylate; MAAm=N-methylolacrylamide.
3. As redox catalyst, each 0.5% of ammonium persulfate and β-dimethylamino-propionitrile are used based on aqueous solution.
4. To 20 parts of aqueous solution, 58 parts of Toyoura standard sand was used.
5. To 20 parts of aqueous solution, 20 parts of cement was used.
6. Temperature of reaction is 29±2°.
7. ( ) is a starting time of solidification but ' is minute and " shows a second.
8. The determination of value of compressive strength of gel is carried out by a compressive testor acting at a speed of 1 mm./min. using a cylindrical sample of 56 mm. dia. x 100 mm: height.

These reference examples show the fact that in the systems in which ethanoid monomer components are not present, the gels formed thereby are deficient in the strength of gel.

EXAMPLE 16

Monomer components

| | Mixed ratio (weight percent) |
|---|---|
| Calcium methacrylate | 75.2 |
| 2-hydroxy-ethylmethacrylate | 10.1 |
| Methylene-bis-acrylamide | 14.7 |

Catalyst components

| | Parts by weight for total aqueous solution |
|---|---|
| Ammonium persulfate | 0.25 |
| β-Dimethyl-aminopropionitrile | 0.50 |

Mixture of soil and cement

| | Parts |
|---|---|
| Cement | 30.8 |
| Toyoura standard soil | 61.4 |

(Previously mixing thoroughly together for 3 minutes.)
20 ml. of aqueous solution consisting of 12.5% by weight of monomer components and catalyst components above was added to the mixture of soil and cement, and was kneaded for 3 minutes and poured into a tube made of acrylic resin while being pressed with a glass rod thereinto. After lapse of 6 to 7 minutes, the setting was initiated after about 2 hours, the compressive strength observed was 4.2 kg./cm.$^2$.

EXAMPLE 17

Monomer components

| | Weight percent |
|---|---|
| Calcium methacrylate | 67.0 |
| Propylene glycol monoacrylate | 20.0 |
| 1,3-di (acrylamido-methyl)-2-imidazolidone | 13.0 |

Catalyst components } Same as Example 16
Mixture of soil and cement }

20 ml. of aqueous solution consisting of 13.8% by weight of monomer components and catalyst components above was added to soil and cement mixture and was treated the same procedure as in Example 16. After elapse of 6 to 7 minutes, setting took place and the compression strength under a load of 4.4 kg./cm.$^2$ after about 2 hours was observed.

EXAMPLES 18–24

Mixed aqueous solutions consisting of sodium acrylate or sodium methacrylate, water-soluble ethenoid monomer and water-soluble divinyl compound, respectively, as denoted in Table 2, was mixed with cement together with a redox catalyst, and the gelations thereof were initiated after about 2–3 minutes. The compression strength of respective cement gels were measured after about two hours. The results observed are shown in Table 2.

REFFERENCE EXAMPLES 6–7

Aqueous solutions of sodium acrylate or mixed aqueous solutions of sodium acrylate and 1,3-di-(methylacrylamide) were mixed with cement together with a redox catalyst. As a result, the setting took place after about 8 and about 3 minutes, respectively. The respective compression strength of cement gels were measured after about two hours. The results observed are shown in Table 2'.

TABLE 2

| Number of Example | Polymerization component | Mixed ratio of polymerization component (Percent) | Total resin monomer concentration | Compressive strength of geling after two hours (kg./cm.$^2$) |
|---|---|---|---|---|
| 18 | NaA / HEMA / DAI | 77.2 / 14.4 / --- | 19.2 | 9.6 |
| 19 | NaA / HEMA / DAI / MBAAm | 70.1 / 18.2 / 6.7 / 5.0 | 19.8 | 10.0 |
| 20 | NaA / HEMA / DAI | 81.7 / 6.2 / 12.1 | 19.2 | 5.5 |
| 21 | NaA / HEMA / DAI | 87.2 / 6.5 / 6.3 | 18.5 | 4.0 |
| 22 | NaA / AEMA / DAI | 67.5 / 21.2 / 11.3 | 20.6 | 6.0 |
| 23 | NaA / HEMA / MBAAm | 73.4 / 19.1 / 7.5 | 18.9 | 6.2 |
| 24 | NaMA / HEMA / DAI | 73.0 / 16.4 / 10.6 | 21.0 | 4.0 |

TABLE 2'

| Number reference example | Polymerization component | Mixed ratio of polymerization component (Percent) | Total resin monomer concentration | Compressive intensity of gelable after two hours kg./cm.$^2$ |
|---|---|---|---|---|
| 6 | NaA | 100 | 17.4 | 0.3 |
| 7 | NaA / DAI | 87.7 / 12.3 | 18.8 | 3.5 |

NOTES:
1. All percents are herein represented by weight percent.
2. Sign of polymerization components shows the following compounds: NaA=Sodium acrylate; NaMA=Sodium methacrylate; DAI=1,3-di (methyl acrlyamide)-2-imidazolidone; AEMA=–dimethylaminoethylmethacrylate; HEMA=β-hydroxyethylmethacrylate; MBAAm=N,N'-methylene-bis-acrylamide.
3. As the common conditions in each case, 0.5% each of ammonium persulfate and β-dimethylaminopropionitrile based on the aqueous solution, and 20 parts of cement per 20 parts of the aqueous solution were used.

EXAMPLE 25

| | Parts |
|---|---|
| Sodium acrylate | 1.8 |
| Hydroxyethylmethacrylate | 0.2 |
| Methylene-bis-acrylamide | 0.2 |
| Ammonium persulfate | 0.1 |
| β-Dimethyl-aminopropionitril | 0.1 |
| Water | 18.0 |
| Cement | 30.8 |
| Toyoura standard sand | 61.4 |

The monomer and catalyst components above are dissolved in water and added to the mixture of cement and Toyoura standard sand, then the sample was set after elapse of 3 minutes. After one hour, the compressive strength of the sample was measured and showed the result of 10.0 kg./cm.$^2$.

EXAMPLE 26

| | Parts |
|---|---|
| Calcium acrylate | 3.2 |
| β-Hydroxyethylmethacrylate | 0.3 |
| Methylene-bis-acrylamide | 0.2 |
| Ammonium persulfate | 0.1 |
| β-Dimethyl-aminopropionitril | 0.1 |
| Water | 17.5 |
| Cement | 30.8 |
| Toyoura standard sand | 61.4 |

The monomer and catalyst components above are dissolved in water and added to the mixture of cement and Toyoura standard sand, then the sample was set after elapse of 2 minutes. After elapse of 2 strengths of cement gels was measured after elapse of 2 hours. The results observed are shown in Table 2.

EXAMPLE 25

A mixture consisting of 1.8 parts of sodium acrylate, 0.2 part of hydroxyethylmethacrylate, 0.2 part of methylene-bis-acrylamide, 18 parts of water, 0.1 part of ammonium persulfate, 0.1 part of dimethylaminopropionitrile, 30.8 parts of cement and 61.4 parts of Toyoura standard sand were set after elapse of 3 minutes since the mixture has been prepared. After one hour, a measurement of strength was carried out to show the result of 10.0 kg./cm.$^2$.

EXAMPLE 26

A cement mixture consisting of 3.2 parts of calcium acrylate, 0.3 part of hydroxyethylmethacrylate, 0.2 part of methylenebisacrylamide, 0.1 part of ammonium persulfate, 0.1 part of β-methylaminopropionitrile, 17.5 parts of water, 30.8 parts of cement and 61.4 parts of Toyoura standard sand was set after elapse of 2 minutes since preparation of the mixture. The compression strength as measured after one hour showed 11.5 kg./cm.$^2$.

REFERENCE EXAMPLE 8

A mixture consisting of 3.3 parts of calcium acrylate, 0.1 part of ammonium persulfate, 0.1 part of β-dimethylaminopropionitrile, 18 parts of water, 30.8 parts of cement and 61.4 parts of Toyoura standard sand was set after elapse of 3 minutes since preparations of the mixture. The compression strength as measured after one hour showed 6.0 kg./cm.$^2$.

EXAMPLES 27–30

Mixed aqueous solutions of metal salts of acrylic acid, water-soluble ethenoid monomer and water soluble divinyl compounds were mixed with cement together with a redox catalyst, and as a result, the gelation was initiated in about 20 seconds to 2 minutes. The respective compression strength of the gels as measured after elapse of 2 hours are shown in Table 3.

TABLE 3

| Number of Example | Polymerization component | Mixed ratio of polymerization component | Total resin monomer concentration | Compressive intensity of gel |
|---|---|---|---|---|
| 27 | Ca(A)$_2$<br>HEMA<br>DAI | 71.2<br>14.6<br>14.2 | 16.3 | 8.7 |
| 28 | Ca(A)$_2$<br>Dimethylamino ethylmethacrylate<br>DAI<br>MBAAm | 69<br>17<br><br>7<br> | 16.6 | 7.0 |
| 29 | Ca(A)$_2$<br>HEMA<br>MBAAm | 75<br>16<br>9 | 15.3 | 6.3 |
| 30 | Sr(A)$_2$<br>HEMA<br>DAI | 72<br>12.1<br>11.9 | 21.2 | 5.2 |

EXAMPLE 31

To 50 parts of an aqueous solution containing 9 parts of acrylamide and 1 part of 1,3-di(acrylamidomethyl)-2-imidazolidone, were added 1 part of dimethylaminoethanol, 0.1 part of silver nitrate and 100 parts of portland cement to mix together. To the cement milk mixed aqueous solution at 15° C., was added 50 parts of water containing 1 part of ammonium persulfate, and as a result of stirring the setting was completed after elapse of 8 seconds to form a water-insoluble, water-impermeable and homogeneous cement gel. The compression strength as measured after elapse of 2 hours showed 1.8 kg./cm.$^2$. Furthermore, when the above reaction was repeated without addition of 0.1 part of silver nitrate, the cement gel was formed after elapse of 14 seconds.

EXAMPLE 32

In the same procedure as in Example 31, reactions were carried out but using 0.1 part each of various reductive metal ions in place of 0.1 part of silver nitrate, and as a result, the respective gelation times were as follows. The respective gelation times as measured without addition of amine were shown together. When amine was not added, there was no instantaneous setting property and were formed inhomogeneous gels.

| Heavy metal salt | Gelation time (second) | Gelation time without addition of amine (second) |
|---|---|---|
| Stannous chloride (SnCl$_2$.6H$_2$O) | 7 | 20–30. |
| Ferrous sulfate (FeSO$_4$.7H$_2$O) | 8 | More than 10.[1] |
| Manganous chloride (MnCl$_2$.4H$_2$O) | 9 | 240. |
| Lead acetate | 10 | More than 600. |
| Zinc chloride | 11 | Do. |
| Nickel chloride (NiCl$_2$.6H$_2$O) | 12 | Partially gelled. |
| A 7:3 mixture of ferrous sulfate and cupric sulfate. | 5 | More than 10.[1] |

[1] Gelation is inhomogeneous and the gel is brittle.

EXAMPLE 33

To 70 parts of an aqueous solution containing 14.5 parts of calcium acrylate, 1.3 parts of 2-hydroxyethylmethacrylate and 2.5 parts of methylene-bis-acrylamide, were added and mixed therewith 1 part of dimethylaminopropionitrile, 0.1 part of stannous chloride and 100 parts of portland cement. To the cement milk mixed aqueous solution at 15° C., was added and stirred therewith 30 parts of water containing 1 part of potassium persulfate. As a result, the gelation was initiated after elapse of 10 seconds to form a water-insoluble, water-impermeable and homogeneous cement gel. The uniaxial compression strength as measured after elapse of 2 hours showed 4.4 kg./cm.$^2$.

EXAMPLE 34

100 parts of a mixed aqueous solution containing 9 parts of acrylamide and 1 part of glyceroldiacrylate as polymerization components, and 0.2 part of ammonium persulfate, 0.25 part of N-methylmorpholine and 0.01 part of ferrous sulfate as a redox catalyst was mixed with 290 parts of Toyoura standard sand. The resultant mixture was allowed to stand in air at 28° C., and as a result, said mixture was set after elapse of 2 minutes to form a strong sand gel which is water-impermeable and water-insoluble.

The compression strength as measured after elapse of 2 hours showed 6.0 kg./cm.$^2$.

In this case, when 0.01 part of ferrous chloride was not added thereto, no gelation was observed even after elapse of 2 hours and the formation of sand gel was not observed as well without 0.25 part of N-methylmorpholine.

EXAMPLE 35

100 parts of a mixed aqueous solution containing (a polymerization component consisting of 14 parts of magnesium methacrylate, 2.5 parts of hydroxypropylacrylate and 2.5 parts of 1,3-dimethylmethacrylamide-2-imidazlidone) and (also containing 0.5 part of ammonium persulfate, 0.25 part of hexamethylenediamine and 0.25 part of silver nitrate), was mixed with 2.90 parts of Toyoura standard sand. The resultant mixture was allowed to stand in air at 28° C., and the gelation was initiated after elapse of 2 minutes and 20 seconds, and was formed a strong sand gel which is water-impermeable and water-insoluble. The compressive strength as measured after elapse of 2 hours showed 5.7 kg./cm.$^2$.

In this case, when silver nitrate was not added thereto, the gel time was about one hour, and when addition of hexamethylene diamine was not made thereto, the gelation time was 5 minutes.

EXAMPLE 36

To 50 parts of an aqueous solution containing 9 parts of acrylamide and 1 parts of methylene-bis-acrylamide, were added and mixed therewith 0.1 part of cobaltic chloride ($CoCl_2 \cdot 6H_2O$) and 100 parts of portland cement. To the resultant cement milk mixed aqueous solution, was added and stirred 50 parts of water containing one part of ammonium persulfate. The resultant mixture was completed to set up after elapse of 26 seconds to form a homogeneous cement gel which is water-insoluble and impermeable to water.

EXAMPLE 37

To 50 parts of an aqueous solution containing 9 parts of acrylamide and 1 part of 1,3-di(acrylamidemethyl)-2-imidazolidone, were added and mixed therewith one part of N-methylmorpholine, 0.1 part of copper sulfate ($CuSO_4 \cdot 5H_2O$) and 100 parts of portland cement. To the aqueous solution mixed with cement was added 50 parts of water containing 1 part of ammonium persulfate, and the mixture was stirred to complete the setting after elapse of 46 seconds at 15° C. As a result, there was formed a homogeneous cement gel which is water-insoluble and water-impermeable. Furthermore, when the above reaction was repeated without addition of the copper sulfate, the setting was completed after elapse of 70 seconds, and when the above reaction was carried out without addition of N-methylmorpholine, only a partial gelation took place after elapse of 10 minutes.

REFERENCE EXAMPLE 9

Table 4 shows that in the system in which only amine has been added to peroxide catalyst, there is a limit in shortening the gelation time even when the amount of the amine has been increased.

To 50 parts of an aqueous solution containing 9 parts of acrylamide, 1 part of 1,3 - di(acrylamidomethyl)-2-imidazolidone, were added and mixed therewith the predetermined amounts of β-dimethylaminopropionitrile and 100 parts of portland cement.

To the aqueous solution mixed with cement at 27° C., was added and stirred 50 parts of water containing 1 part of ammonium persulfate. As a result, the respective setting times spent therefore were shown in the second column of Table 4.

Besides the predetermined amounts of dimethylaminopropionitrile, 0.1 part of stannous chloride was further added thereto and the reaction were carried out in the same procedure as above. The respective setting times spent therefore in these cases were shown in the third column of Table 4.

TABLE 4

| 1 | 2 | 3 |
|---|---|---|
| Amount of dimethylaminopropionitrile added (part) | Setting time spent (second) | Setting time spent in case stannous chloride has been added (second) |
| 1 | 15–16 | 4 |
| 2 | 11 | 3–4 |
| 2.5 | [1] 7–8 | |
| 3 | | 2–3 |
| 8 | | 2–3 |
| 8.8 | [2] 7–8 | |

[1] Setting of cement did not promote moreover, while it is allowed to stand in water.
[2] Gel is soft.

EXAMPLE 38

100 parts of aqueous solution containing a polymerization component consisting of 13 parts of calcium acrylate, 2.5 parts of 2-hydroxyethylmethacrylate and 2.5 parts of 1.3-di(acrylamidemethyl)-2-imidazolidone, and also containing 0.5 part of amminoum persulfate, 1 part of maltose and 0.25 part of silver nitrate as a redox catalyst, was mixed with 290 parts of Toyura standard sand. The resultant mixture was allowed to stand in air at 28° C., the mixture was set after elapse of 2 minutes and 20 seconds to form a sand gel which was impermeable to water and water-insoluble. The compression strength as measured after elapse of 2 hours showed 6.0 kg./cm.$^2$.

EXAMPLE 39

To 50 parts of an aqueous solution containing 9 parts of acrylamide and 1 part of 1,3-di(acrylamidomethyl), were added and mixed therewith 1 part of rongalite and 50 parts of Portland cement. When 50 parts of water containing 1 part of ammonium persulfate was added to the aqueous solution mixed with cement and mixed therewith, the mixture was set with stirring after elapse of 20 seconds to form a homogeneous and strong cement gel which was insoluble in water and impermeable to water. In this case, the pH of cement milk was 12.5, and the reaction temperature was 15° C.

EXAMPLE 40

20 parts of aqueous solution containing a polymerizable component consisting of 4 parts of sodium methacrylate, 0.25 part of 2-hydroxyethylmethacrylate and 0.5 part of 1,3-acrylamidomethyl-2-imidazolidone, and also containing a redox catalyst consisting of 0.1 part of ammonium persulfate and 0.2 part of sodium formaldehyde sulfoxylate, was mixed with 58 parts of Toyoura standard stand. The resultant mixture was allowed to stand in air at 28° C. The relationship between the pH of the mixed aqueous solution and gelation time were as follows:

pH: Gelation time
12.8 ———————— 50 seconds.
6.2 ———————— 4 minutes and 20 seconds.
5.1 ———————— 5 minutes.

In each of the above cases, there were formed the strong sand gels which were water-impermeable and water-insoluble. The respective compression strength as measured after elapse of 2 hours since the gelation showed 7.5 kg./cm.$^2$.

EXAMPLE 41

To 50 parts of an aqueous solution containing 9 parts of acrylamide and one part of 1,3-di(acrylamidomethyl)-2-imidazolidone, were added and mixed therewith 0.1 part of copper sulfate ($CuSO_4 \cdot 5H_2O$) and 100 parts of Portland cement. To the cement milk, at 20° C., was added 50 parts of water containing one part of ammonium persulfate. On stirring, the mixture was set after elapse of 40 seconds to form a homogeneous cement gel which was water-insoluble and water-impermeable. The uniaxial compression strength as measured after elapse of 2 hours showed 1.6 kg./cm.$^2$.

In this case, even when the setting was effected in the absence of component either D-fructose or copper sulfate, only a very small portion of gel was observed, after elapse of 10 minutes.

EXAMPLE 42

100 parts of aqueous solution, of which the pH has been adjusted to 11 with addition of sodium hydroxide, containing a polymerization component consisting of 9 parts of acrylamide and 1 part of 1,3-di(acrylamidomethyl)-2-imidazolidone, and also containing 0.5 part of ammonium persulfate, 1 part of L-sorbose and 0.25 part of copper sulfate as a redox catalyst, was mixed with 290 parts of Toyoura standard sand. The resultant mixture was allowed to stand in air at 28° C. After elapse of one minute and 30 seconds, the mixture formed a strong sand gel which was water-impermeable and water-insoluble. The uniaxial compression strength as measured after elapse of two hours showed 5.7 kg./cm.$^2$.

In this case, when the gelation was effected in the absence of 0.25 part of copper sulphate, 2 hours was required as the gelation time.

EXAMPLE 43

100 parts of a mixed aqueous solution, of which the pH has been adjusted to 11 with addition of sodium hydroxide, containing a polymerization component consisting of 17 parts of sodium methacrylate, 4 parts of 2-hydroxyethylmethacrylate and 2.5 parts of 1,3-di(acrylamidomethyl), and also containing 0.5 part of ammonium persulfate, 1 part of D-galactose and 0.25 part of copper sulfate as a redox catalyst, was mixed with 290 parts of Toyoura standard sand. The resultant mixture was allowed to stand in air at 28° C. As a result, the mixture formed after elapse of 2 minutes a strong sand gel which was water-impermeable and water-insoluble. The uniaxial compression strength as measured after elapse of 2 hours showed 8.5 kg./cm.$^2$.

EXAMPLE 44

To 50 parts of an aqueous solution containing 9 parts of acrylamide and 1 part of 1,3-di(acrylamidomethyl)-2-imidazolidone, were added and mixed therewith 1 part of L-sorbose, 0.1 part each of salts of reductive metal ions and 50 parts of portland cement. To the cement milk at 15° C., was respectively added 50 parts of water containing one part of ammonium sulphate. The gelation times spent after stirring were shown below. Furthermore, when the setting was effected in the absence of a salt of reductive metal ion, only a slight amount of gel was observed.

| Heavy metal salt: | Gelation time spent |
| --- | --- |
| Stannous chloride | 10 seconds to 2 minutes. |
| Ferrous sulfate | 10 seconds to 4 minutes. |
| Silver nitrate | 53 seconds. |
| Manganic chloride | 10 seconds to 30 seconds. |
| Cobalt chloride | About 4 minutes. |
| Nickel chloride | 2 minutes to 3 minutes. |
| Copper sulfate | 50 seconds. |

EXAMPLES 45–47

Into 20 parts each of water, at 20° C., were dissolved 4.6 parts of acrylamide and 0.4 part of 1,3-di(acrylamidomethyl)-2-imidazolidone. To the resultant solutions, were further added respectively 0.5 part of β-diketone and 25 parts of cement to obtain cement milks. To the cement milks, was respectively added and mixed therewith while being thoroughly stirring 25 parts of water containing 0.5 part of ammonium persulfate. As the result, the respective setting time of the cement milks were observed as shown in Table 5 depending on the kind of the β-diketones employed. The strong and homogeneous cement gels formed thereby were all water-insoluble and water-impermeable.

TABLE 5

| β-Diketone | | Setting time, seconds |
| --- | --- | --- |
| Example: | | |
| 45 | Ethylacetoacetate | 5 |
| 46 | Sodium acetoacetate | 24 |
| 47 | Methyl β-acryloyl acetoacetate | 20 |

EXAMPLE 48

4.6 parts of acrylamide and 0.4 part of 1,3-di(acrylamidomethyl)-2-imidazolidone were dissolved in 20 parts of water at 20° C. Then, 0.1 part of ethyl acetoacetate, 0.05 part of stannous chloride and 25 parts of portland cement were further added thereto. When 25 parts of water containing ammonium persulfate was added to the cement milk, said cement milk was set after elapse of 9 seconds to obtain a homogeneous and strong cement gel which was water-impermeable and water-insoluble.

Furthermore, when 0.05 part of ferrous sulfate was added in place of the stannous chloride, the setting was completed after elapse of 9 seconds to obtain similarly a strong cement gel.

What is claimed is:
1. In a rapid setting method for setting cement by adding an aqueous solution of gelable composition consisting of at least two components selected respectively from the groups (1) a water-soluble vinyl monomer and (2) 1–30% by weight of a water-soluble divinyl monomer and a catalytic amount of a redox catalyst to construction materals, the improvement comprising carrying out the reaction using β-dinetone as a reductive component of said redox catalyst.

2. A rapid setting method for setting cement according to claim 1 wherein the water-soluble vinyl monomer includes at least one member selected from the group consisting of a a monovalent metal salt of acrylic acid, a monovalent metal salt of methacrylic acid, 2-hydroxyethylmethacrylate, dimethylaminoethylmethacrylate, propyleneglycolmonoacrylate, acrylamide, methacrylamide, N-methylolacrylamide, N-methylolmethacrylamide and acrylonitrile, and the water-soluble divinyl monomer is at least one member selected from the group consisting of glyceroldiacrylate, glyceroldimethacrylate, 1,3-di(methacrylamide)-2-imidazolidone, 1,3 - di(methylmethacrylamide)-2-imidaazolidone and a compound represented by the formula:

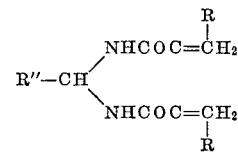

wherein R is a member selected from hydrogen and methyl and R″—CH< is a hydrocarbon radical of aldehyde.

3. In a process for stabilizing cement by adding thereto an aqueous solution of gelable composition consisting of at least two components selected respectively from the groups (1) a water-soluble vinyl monomer and (2) 1–30% by weight of a water-soluble divinyl monomer and a catalytic amount of a redox catalyst, the improvement which comprises carrying out the reaction in an alkaline environment using β-diketone and one member selected from silver, iron and tin ions as reductive components of said redox catalyst.

4. In a process for stabilizing construction material selected from soil and cement by adding thereto an aqueous solution of gelable composition consisting of at least two components selected respectively from the groups (1) a water-soluble vinyl monomer, and (2) 1–30% by weight of a water-soluble divinyl monomer, and a catalytic amount of a redox catalyst, the improvement which comprises using sodium formaldehyde sulfoxylate as a reductive component of said redox catalyst.

5. In a process for stabilizing construction material selected from soil and cement by adding an aqueous solution of gelable composition consisting of at least two components selected respectively from the groups (1) a water-soluble vinyl monomer and (2) 1–30% by weight of a water-soluble divinyl monomer and a catalytic amount of a redox catalyst, the improvement which comprises using, as reductive components of said redox catalyst, a reductive saccharide together with one metal ion selected from the groups consisting of silver, copper, tin, iron, manganese, cobalt and nickel.

6. In a process for stabilizing construction material selected from soil and cement by adding thereto an aqueous solution of gelable composition consisting of at least two components selected respectively from the groups (1) a water-soluble vinyl monomer and (2) 1–30% by weight of a water-soluble divinyl monomer and a catalyst amount of a redox catalyst, the improvement which comprises using, as reductive components of said redox catalyst, reductive saccharide together with copper ion and iron ion.

References Cited

UNITED STATES PATENTS

| | | | |
|---|---|---|---|
| 2,581,402 | 1/1952 | Fryling | 260—17.4(SG) |
| 2,838,466 | 6/1958 | Padbury et al. | 260—29.6(HN) |
| 2,865,177 | 12/1958 | Gnaedinger | 260—29.6(TA) |
| 2,922,768 | 1/1960 | Mino et al. | 260—17.4(GC) |
| 2,801,984 | 8/1957 | Morgan et al. | 260—29.6(H) |
| 3,210,310 | 10/1965 | Holbert et al. | 260—29.6(HN) |
| 3,247,900 | 4/1966 | Perry et al. | 260—29.7 |

MURRAY TILLMAN, Primary Examiner

W. J. BRIGGS, SR., Assistant Examiner

U.S. Cl. X.R.

61—36R; 166—295; 252—8.55R; 260—96.6H, 29.6HN, 41R, 80.3C

UNITED STATES PATENT OFFICE
CERTIFICATE OF CORRECTION

PATENT NO. : 3,580,879
DATED : May 25, 1971
INVENTOR(S) : Einosuke HIGASHIMURA et al.

It is certified that error appears in the above-identified patent and that said Letters Patent are hereby corrected as shown below:

Col. 1, line 7 change

"Claims priority, application Japan, Sept. 8, 1966,

41/59,358" to

--Claims priority, applications Japan,

Sept. 8, 1966,    41/59,358;

Sept. 13, 1966,   41/60,492;

Dec. 29, 1966,    42/529; and

April 18, 1967,   42/24,720--

Signed and Sealed this

Twenty-eighth Day of June 1977

[SEAL]

Attest:

RUTH C. MASON
Attesting Officer

C. MARSHALL DANN
Commissioner of Patents and Trademarks